United States Patent
Anderson

(10) Patent No.: US 8,616,091 B2
(45) Date of Patent: Dec. 31, 2013

(54) PEG BOARD DISPLAY FASTENER AND CONNECTOR

(75) Inventor: Rick David Anderson, Minneapolis, MN (US)

(73) Assignee: Process Displays, New Hope, MN (US)

( * ) Notice: Subject to any disclaimer, the term of this patent is extended or adjusted under 35 U.S.C. 154(b) by 187 days.

(21) Appl. No.: 13/185,647

(22) Filed: Jul. 19, 2011

(65) Prior Publication Data

US 2011/0318138 A1      Dec. 29, 2011

Related U.S. Application Data

(63) Continuation-in-part of application No. 12/710,776, filed on Feb. 23, 2010, now abandoned, which is a continuation-in-part of application No. 12/322,755, filed on Feb. 6, 2009, now abandoned.

(60) Provisional application No. 61/063,967, filed on Feb. 6, 2008.

(51) Int. Cl.
*B25B 13/48*   (2006.01)
*F16B 12/10*   (2006.01)

(52) U.S. Cl.
USPC ............................................ 81/52; 411/402

(58) Field of Classification Search
USPC .......... 81/121.1, 124.2, 125, 52; 24/289–297; 411/402, 411, 147
See application file for complete search history.

(56) References Cited

U.S. PATENT DOCUMENTS

| | | | | |
|---|---|---|---|---|
| 3,687,184 A * | 8/1972 | Wagner | ................ | 411/135 |
| 3,987,568 A * | 10/1976 | Rosenberg | ................ | 40/622 |
| 4,157,725 A * | 6/1979 | Stanaitis | ................ | 411/147 |
| 4,257,465 A * | 3/1981 | Berg | ................ | 411/147 |
| 4,403,895 A * | 9/1983 | Caldwell et al. | ................ | 411/378 |
| 5,326,061 A * | 7/1994 | Hamilton | ................ | 248/239 |
| D365,113 S * | 12/1995 | Ronan | ................ | D15/140 |
| 5,549,234 A * | 8/1996 | Hong | ................ | 227/119 |
| 5,551,817 A * | 9/1996 | Kanie | ................ | 411/107 |
| 5,669,592 A * | 9/1997 | Kearful | ................ | 248/217.4 |
| 5,704,753 A * | 1/1998 | Ueno | ................ | 411/509 |
| 5,716,161 A * | 2/1998 | Moore et al. | ................ | 403/326 |
| 6,102,642 A * | 8/2000 | Kawashita et al. | ................ | 411/401 |
| D457,797 S * | 5/2002 | Huang | ................ | D8/70 |
| 6,520,704 B1 * | 2/2003 | Vidmar et al. | ................ | 403/188 |
| 6,715,384 B1 * | 4/2004 | Kozak | ................ | 81/124.2 |
| D507,650 S * | 7/2005 | Teich | ................ | D24/156 |
| 7,293,482 B1 * | 11/2007 | Wolf et al. | ................ | 81/124.2 |
| 7,438,513 B2 * | 10/2008 | Craven et al. | ................ | 411/402 |
| 7,506,464 B2 * | 3/2009 | Tarter et al. | ................ | 40/596 |
| 7,713,013 B2 * | 5/2010 | Sedgwick et al. | ................ | 411/411 |
| 8,333,540 B2 * | 12/2012 | Nakazato | ................ | 411/508 |
| 8,393,058 B2 * | 3/2013 | Okada et al. | ................ | 24/297 |
| 2006/0076849 A1 * | 4/2006 | Sedgwick et al. | ................ | 310/261 |
| 2008/0289459 A1 * | 11/2008 | Yablon | ................ | 81/451 |
| 2009/0188086 A1 * | 7/2009 | Okada et al. | ................ | 24/297 |
| 2009/0249923 A1 * | 10/2009 | Seidel | ................ | 81/61 |
| 2012/0110793 A1 * | 5/2012 | Watanabe et al. | ................ | 24/289 |

* cited by examiner

*Primary Examiner* — David B Thomas
(74) *Attorney, Agent, or Firm* — Daniel A. Rosenberg; Briggs and Morgan, P.A.

(57) ABSTRACT

A clip includes a head having a thumbscrew protrusion and a body with spaced apart threads. The clip is of various widths and lengths to accommodate, most preferably, different widths and depths of holes in peg board. Most preferably, the clip is sized to accommodate ¼ inch peg board, and is used to releasably secure items such as advertisements and promotional material to the peg board.

5 Claims, 12 Drawing Sheets

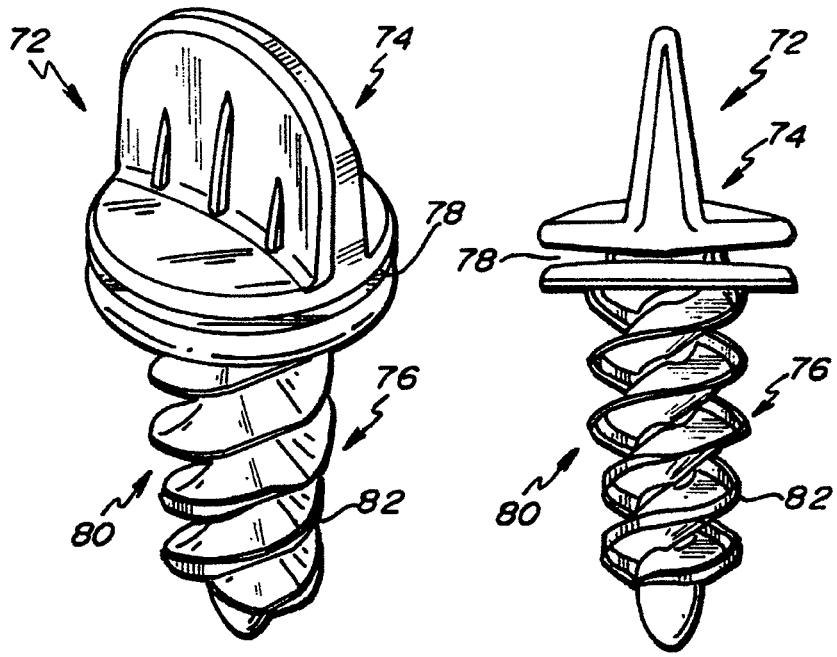
Fig.14  Fig.15
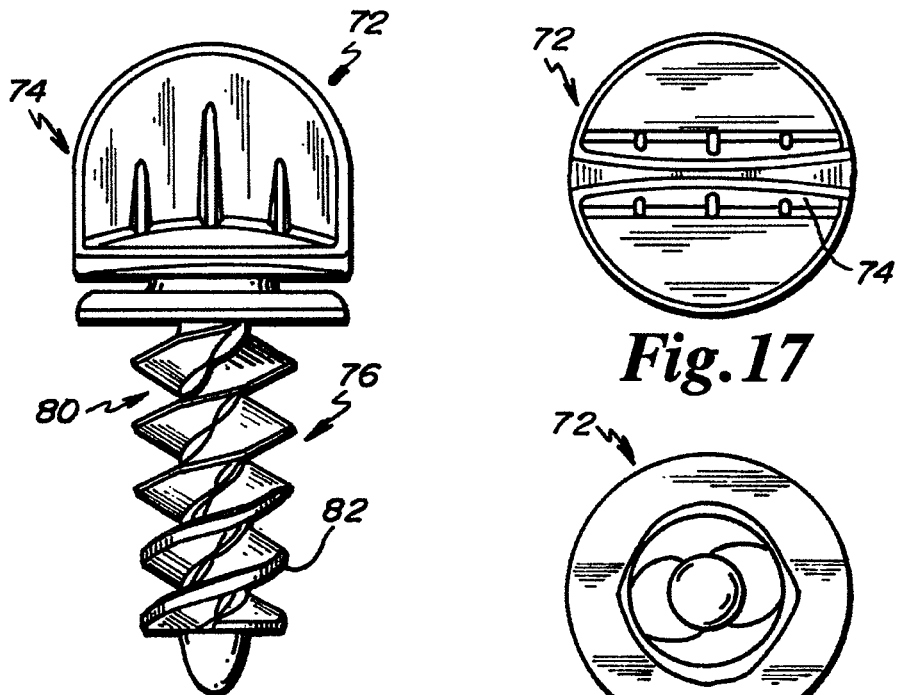
Fig.16  Fig.17
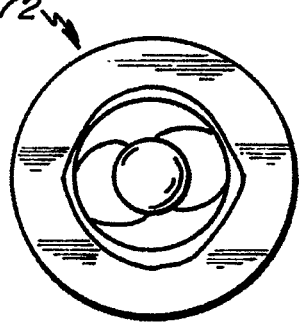
Fig.18

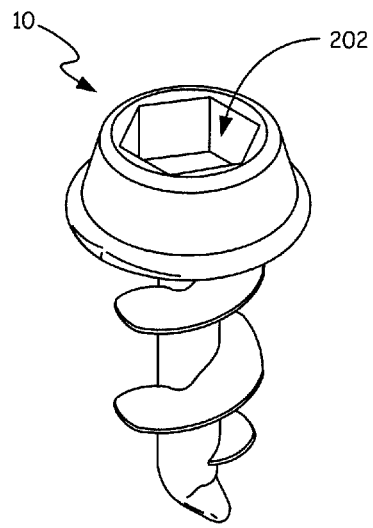
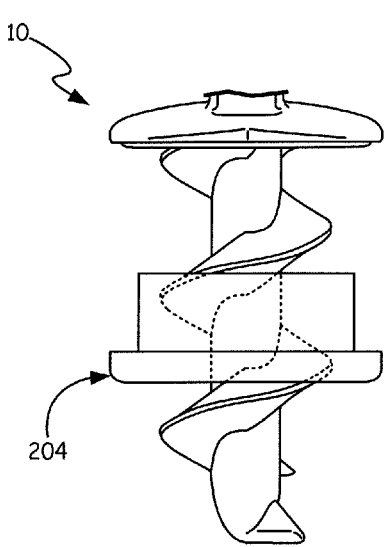
FIG. 32A  FIG. 32B
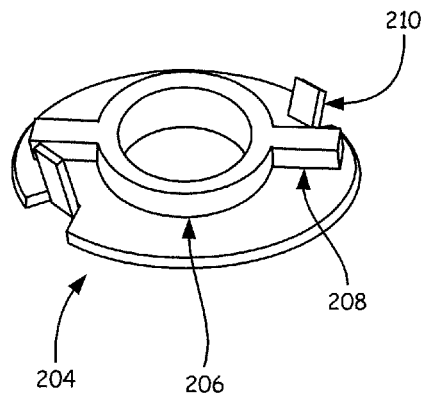
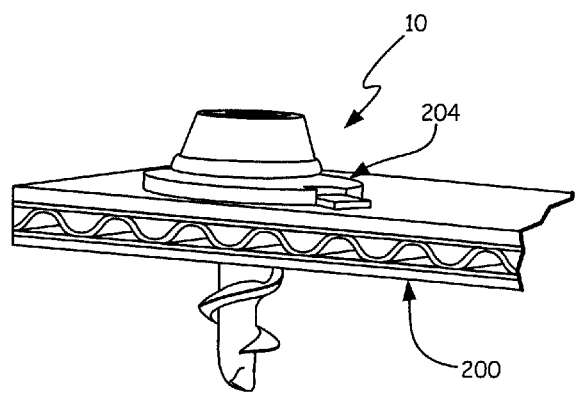
FIG. 32C  FIG. 32D

US 8,616,091 B2

PEG BOARD DISPLAY FASTENER AND CONNECTOR

CROSS REFERENCE TO RELATED APPLICATION

The present application claims priority to, and incorporates by reference hereto, U.S. Provisional Application No. 61/063,967 of the same title, filed Feb. 6, 2008, and U.S. patent application Ser. No. 12/322,755 of the same title, filed Feb. 6, 2009, and U.S. patent application Ser. No. 12,710,776 of the same title, filed Feb. 23, 2010.

FIELD OF THE INVENTION

This invention relates to a connector or fastener for use with a display board. In particular, the invention relates to a reusable fastener designed to secure material such as promotional posters, displays, and brackets to a peg board backing in a retail environment. Of course, a person of ordinary skill in the art will understand that the invention is not necessarily so limited.

BACKGROUND OF THE INVENTION

In retail environments promotional and marketing display material is commonly affixed to open wall space near, or in anticipation of the arrival of, goods or services for sale. Conventionally, these materials, which can include posters, displays, product samples, or other materials, are affixed to a backing adapted for repeated display and removal of the items. A common type of backing is referred to as peg board, which consists of a durable material with a pattern of perforations located in a predetermined pattern. Connectors, fasteners, or brackets are designed to secure materials to the peg board in a secure manner. Also, due to the fact that these displays are frequently changed the connectors and fasteners must be reasonably capable of removal to allow for such updates.

Prior art connectors include devices that include a generally flat head connected to an extended body that is sized to be captured in the spaced apart holes of the peg board. The connectors pass through holes in the material to be displayed and then into the peg board and thereby provide a reasonably stable mounting mechanism. Such connectors include so called "canoe clips." These clips have a body that includes an elongated center gap and are sized slightly wider than the peg board holes, such that upon insertion the body is compressed about the gap to form sufficient tension to retain the clip. The head of the clip is flat without any indentations or grooves for removal. In fact, the clips do not include any particular structural elements to allow for removal. When the display is replaced the clips are pulled or pried out of place, normally in a destructive manner, thrown away and new clips are used for the next display. In this manner the clips are disposable and not suitable for reuse.

Another such device is the "Christmas tree" clip. These clips also contain a head and body, however, in this case the body includes a plurality of teeth disposed along the axis of the body, each tooth comprised of a circumferential flange angled to resist removal after insertion. Again, the clips do not include any convenient means of removal and are therefore designed for one-time disposable use.

While these prior art clips are generally inexpensive plastic articles, ultimately the cost of continued replacement of used clips becomes very significant. Furthermore, the environmental impact of disposable clips is detrimental. Additionally, because these clips are not designed to be removed easily, over time they damage the peg board requiring further costs and expense.

Another use of such clips is to assemble displays, and in particular assembly of cardboard or corrugated display material. One such prior art device is known as the Viking clip, which is comprised of plastic and consists of a flathead screw with a nut or wing nut that affixes to the screw. The Viking clip, however, requires manipulation from both sides of the assembly since the nut must be placed on the screw after the screw is placed through the assembly. Frequently, given the size of the assemblies, this requires two people to perform the assembly.

Accordingly, a need exists for a fastener or clip that overcomes the difficulties of the prior art.

BRIEF DESCRIPTION OF DRAWINGS

FIG. 14 is a perspective view of a clip of the present invention.

FIG. 15 is a side view of the clip shown in FIG. 14.

FIG. 16 is a side view of the clip shown in FIG. 15 rotated 90 degrees.

FIG. 17 is a top view of the clip shown in FIG. 14.

FIG. 18 is a bottom view of the clip shown in FIG. 14.

FIG. 32a shows a hex head clip.

FIG. 32b shows the clip and bushing.

FIG. 32c shows the underside of a bushing with flanges and cleats.

FIG. 32d shows the clip and bushing applied to a portion an assembly.

DETAILED DESCRIPTION OF THE PREFERRED EMBODIMENTS

Figure 1:
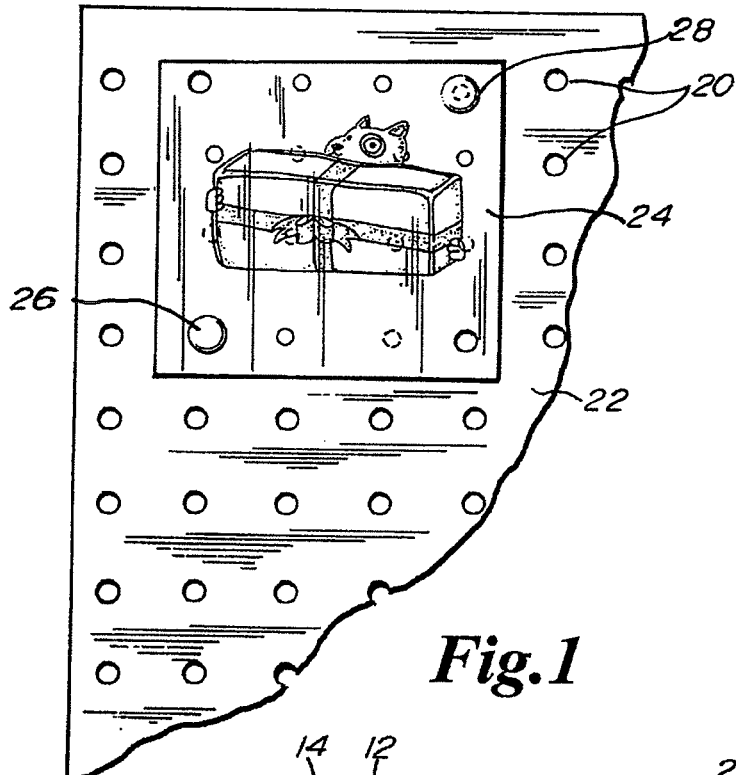
FIG. 1 is a perspective view of a portion of peg board with prior art clips securing an advertisement poster.

In the Figures, various configurations of a fastener/connector clip 10 are shown. The clip 10 includes a head 12 having a thumbscrew protrusion 14, and a body 16 with spaced apart threads 18. The clip 10 is of various widths and lengths to accommodate, most preferably, different width and depth of holes 20 in peg board 22. Most preferably, the clip 10 is sized to accommodate ¼ inch peg board. Of course, variations of size, orientation, and application of the clips 10 are within the scope of the present invention. In particular, the clips 10 are not necessarily limited to use with peg board.

Figure 6:
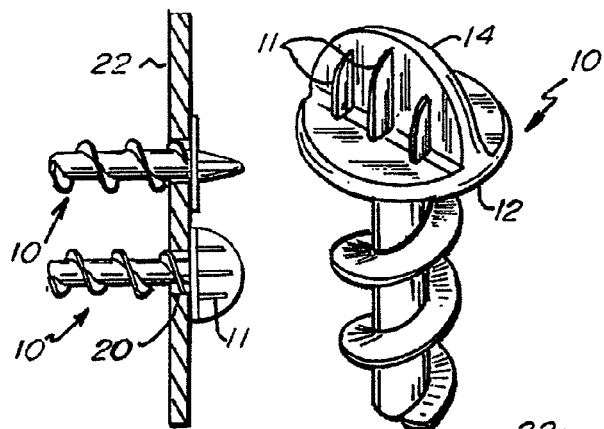
FIG. 6 includes additional views of the clip of the present invention.

As seen best in FIGS. 1 and 6, a conventional peg board 22 is shown which is used to display advertising and promotional material such as the poster 24 shown in FIG. 1. Prior art clips, such as canoe clips 26 or Christmas tree clips 28, as described in the Background are shown securing two corners of the poster 24. As described, the prior art clips 26, 28 are generally effective at securing display materials to peg board, however, they do not include any means for removal that does not result in damage to the clip or the underlying peg board. In particular, the clips 26, 28 can be removed using with a flathead screw diver or similar pry type device, but as stated this usually results in damage.

Figure 2:
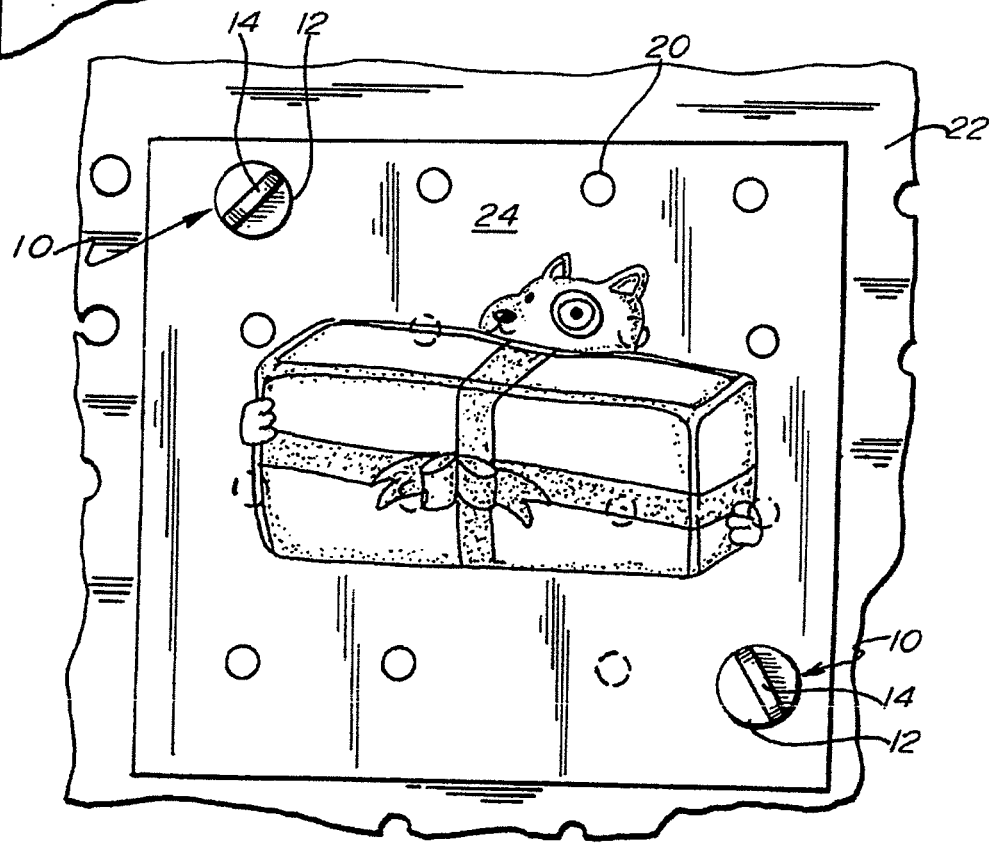
FIG. 2 is a perspective view of the portion of the peg board with clips of the present invention inserted therein.

FIG. 2 shows the peg board 22 with the clips 10 of the present invention in place securing two of the corners of the poster 24. The clips are easily threaded into the holes 20 of the peg board 22 using the thumbscrew 14 of the head 12 of the clips 10. Similarly, the clips 10 can be easily removed in a non-destructive manner, and reused as many times as desired.

Figure 3:
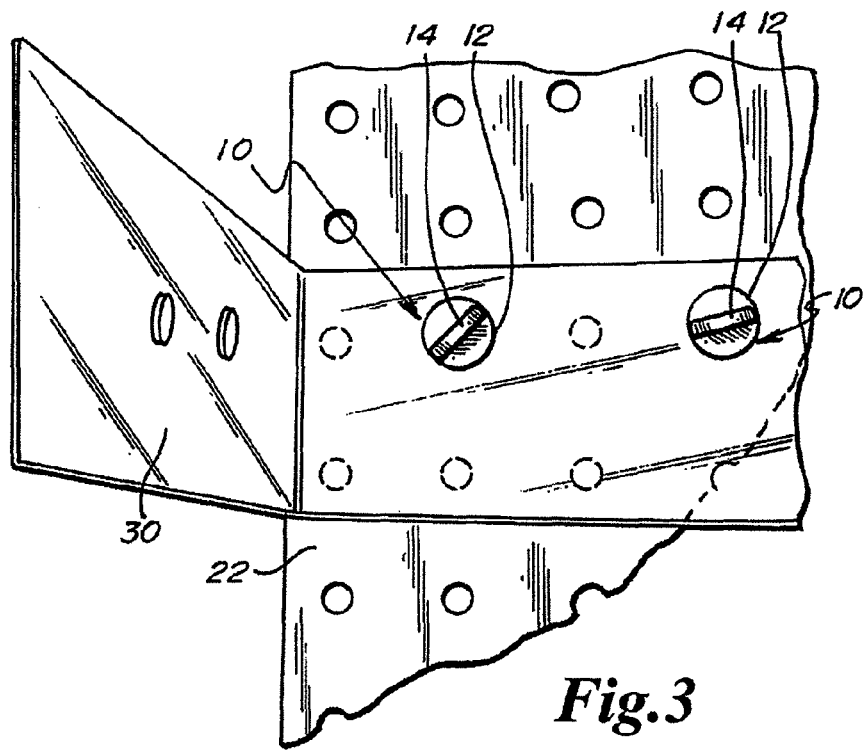
FIG. 3 is a perspective view of the portion of the peg board with the clips of the present invention supporting a Plexiglas mounting bracket.

FIG. 3 shows the clips 10 used to secure a Plexiglas bracket 30 to the peg board 22. The bracket 30 is of a type commonly used in the retail display environment to affix products and further display items to the peg board 22. As can be seen, the clips 10 are easily adapted to releasable securement in this application as well.

Figure 4:
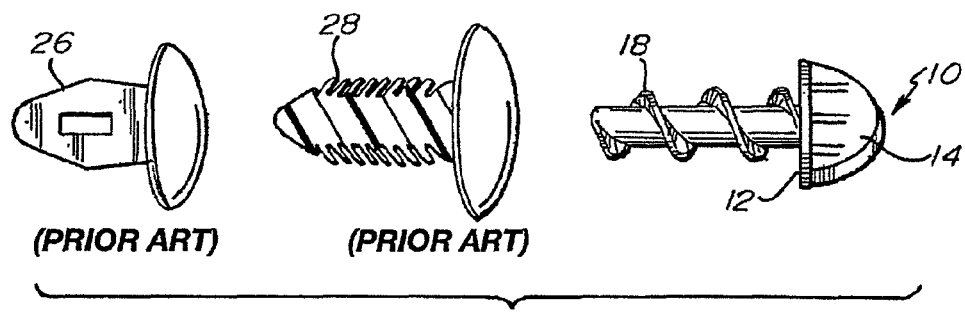
FIG. 4 is a side view of two prior art clips and the clip of the present invention.

FIG. 4 shows in a side by side manner a side view of the clips 10, 26, 28. The widely spaced apart threads 18 are clearly visible in contrast to the teeth of the Christmas tree clip 28 and the compressible gap design of the canoe clip 26. The advantage being that the clips 10 releasably securely engage the peg board 22 with the threads 18 and are easily withdrawn. Shown also is the thumbscrew 14 of the head 12, which provides an easily accessible surface to grasp when inserting or removing the clips 10 from the peg board 22.

Figure 5:
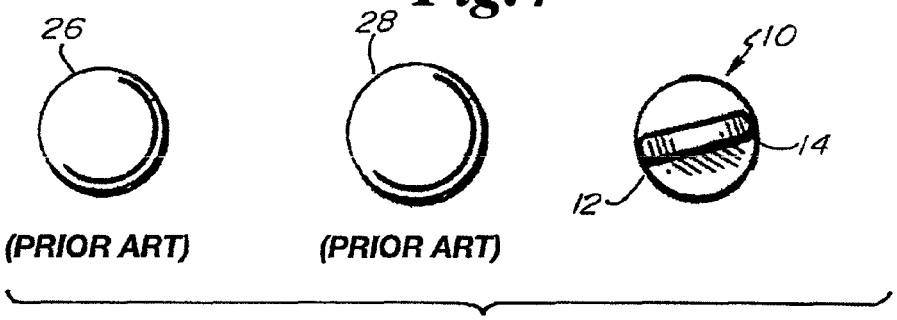
FIG. 5 is a top view of two prior art clips and the clip of the present invention.

FIG. 5 shows in side-by-side manner the tops of the clips 10, 26, 28. Only the clips 10 are adapted for removal and reuse. The prior art clips 26, 28 have planer top surfaces that do not allow for easy grasp and removal, and must be destructively pried out of the peg board 22.

In the foregoing manner the clips 10 substantially overcome the problems of the prior art by providing a clip 10 that is designed for releasable but yet secure attachment of display items to peg board surfaces 22. The clips, therefore, are subject to reuse which saves time, money, effort, and addresses environmental issues associated with the waste of prior art clips.

FIG. 6 shows the clip 10 having ribs 11 in the thumbscrew protrusion 14 of the head 12. The ribs 11 enhance the ability to grip the protrusion 14 of the head 12 of the clip 10 during insertion and removal of the clip 10 from the holes 20 in the peg board 22.

Figure 7:
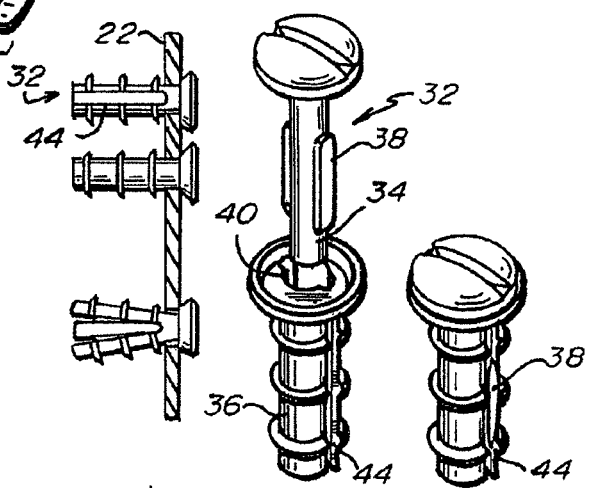
FIG. 7 includes views of a first alternative clip of the present invention.

FIG. 7 shows a first alternative clip 32 of the present invention. The clip 32 is comprised of a pin 34 and body 36. The pin 34 has opposing extending shoulders 38, which fit within the keyed slot 40 of the body 36. The body 36 includes a plurality of teeth 42, or threads, which will assist in retaining the clip 32 when deployed.

After inserting the pin 34 in the keyed slot 40 of the body 36, the shoulders 38 fit into flanges 44 located in the body 36. Next, a screwdriver or "quarter" can be used to turn the pin 34 such that the shoulders 38 no longer rest in the flanges 44 of the body 36, but apply outward pressure to the body 36 that will further assist in retaining the clips 32. This comprises the deployed position, wherein the teeth 42 are pressed against the retaining surface, or form a lock on the backside of the retaining surface, such that the clip 32 cannot be easily removed. Reversing the process will allow the shoulders 38 to return to the non-deployed position and the clip 32 can be easily removed and reused without damage to the retaining surface.

Figure 8:
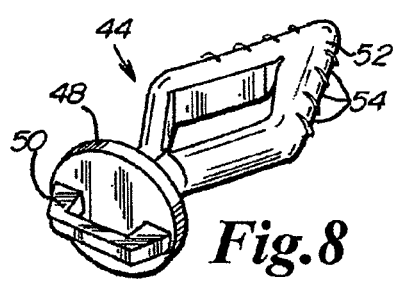
FIG. 8 includes views of a second, third, and forth alternative clip of the present invention.
Figure 8B:
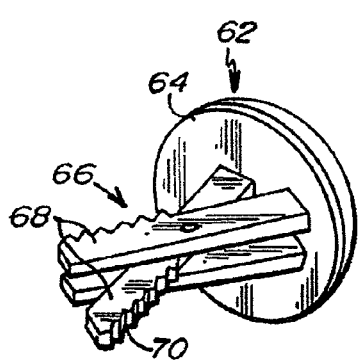
Figure 8A:
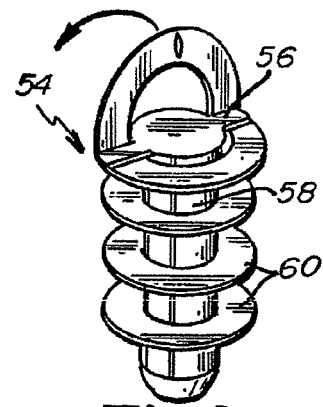
Figure 9:
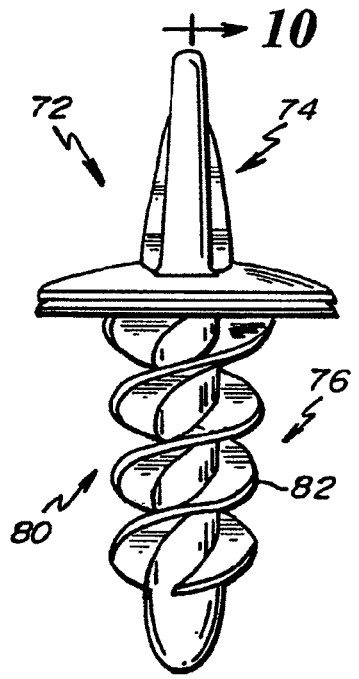
FIG. 9 is a side view of a clip of the present invention.
Figure 10:
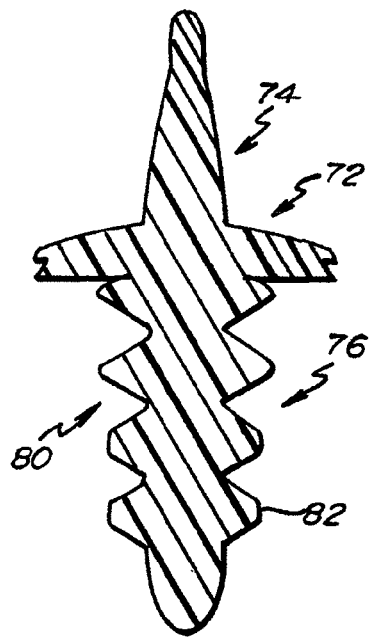
FIG. 10 is a cross-section view of the clip of FIG. 9 taken along the line B-B shown in FIG. 11.
Figure 11:
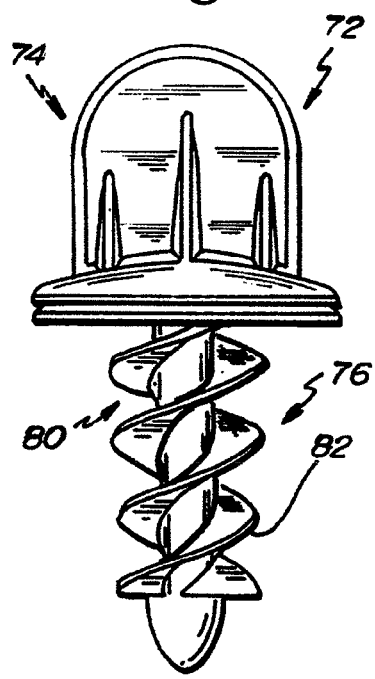
FIG. 11 is a side view of the clip shown in FIG. 9 rotated 90 degrees.
Figure 12:
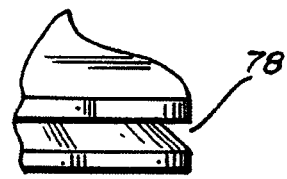
FIG. 12 is a detail view (D) of a notch in the clip shown in FIG. 11.
Figure 13:
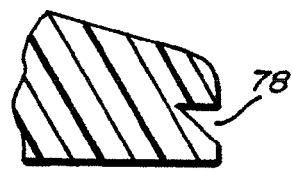
FIG. 13 is a detail view (C) of the notch shown in FIG. 10.
Figure 19:
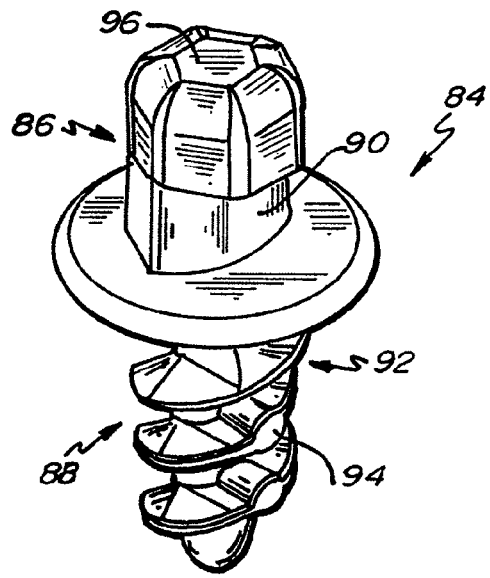
FIG. 19 is a perspective view of a clip of the present invention.
Figure 20:
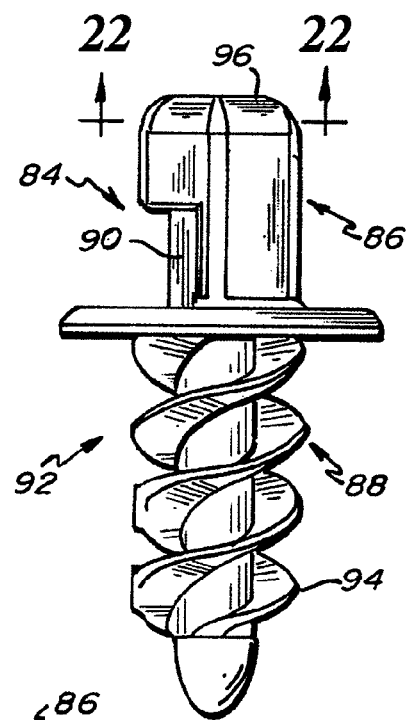
FIG. 20 is a side view of the clip shown in FIG. 19.
Figure 21:
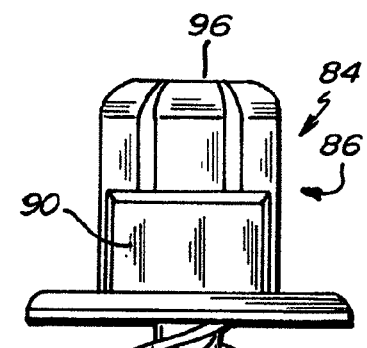
FIG. 21 is a side view of the clip shown in FIG. 20 rotated 90 degrees.
Figure 22:
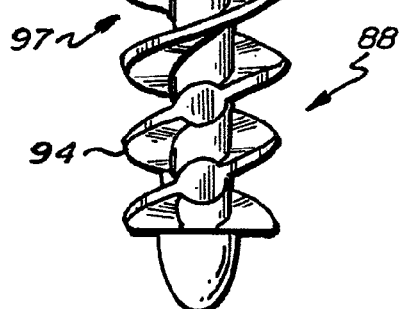
FIG. 22 is a cross-section view of a head of the clip shown in FIG. 20.
Figure 23:
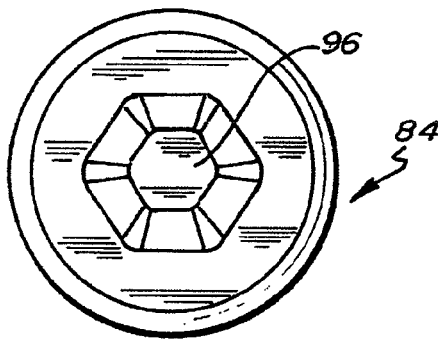
FIG. 23 is a top view of the clip shown in FIG. 19.
Figure 24:
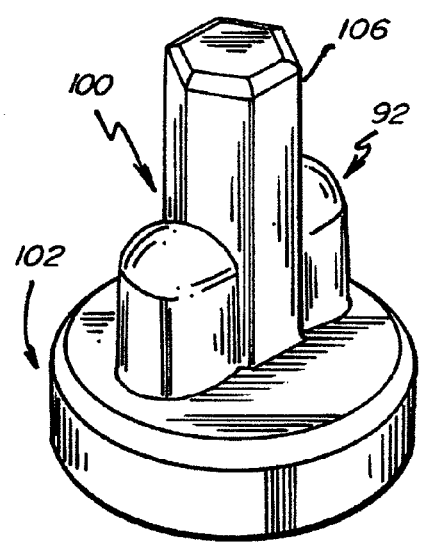
FIG. 24 is a perspective view of a tool.
Figure 25:
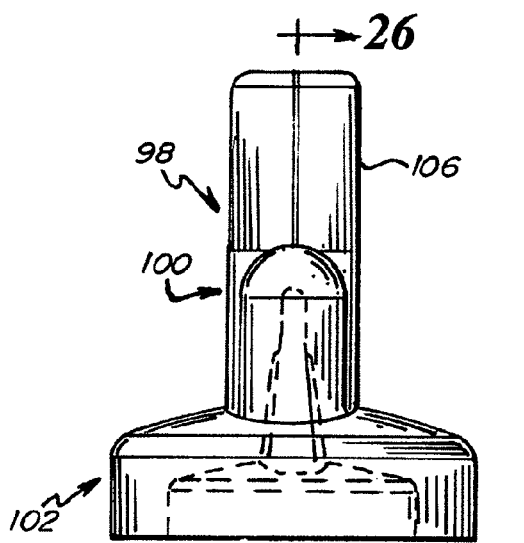
FIG. 25 is side view of the tool shown in FIG. 24.
Figure 28:
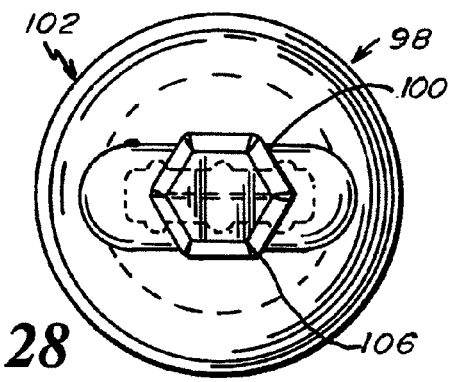
FIG. 28 is a top view of the clip shown in FIG. 24.
Figure 27:
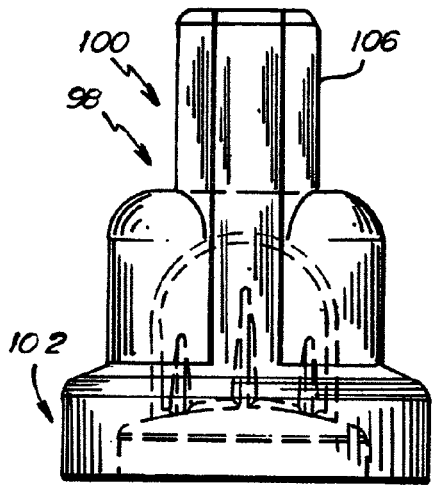
FIG. 27 is a side view of the tool shown in FIG. 25 rotated 90 degrees.
Figure 26:
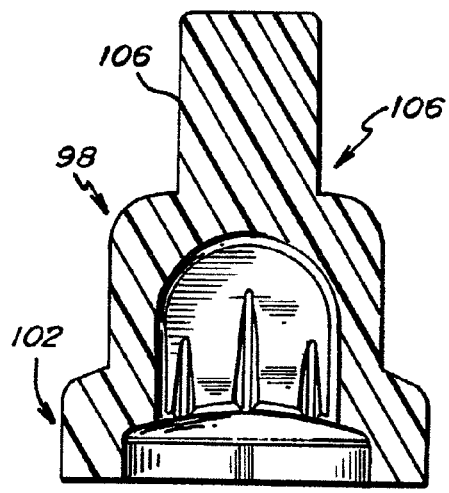
FIG. 26 is a cross-section view of the tool shown in FIG. 25 taken along the line A-A.

Similarly, FIG. 8 shows three further alternative embodiments. In one embodiment, clips 44 include a head 48 with a handle 50, and have a V-shaped open body 52. Upon insertion, the V-shaped body 52 is compressed which create retention tension, along with grooves 54. The handle 50 is shaped to receive the end of a standard screw driver to remove the clip 44. In this manner, the clip 44 is releaseably engageable with a display mounting surface such as peg board.

In yet another embodiment, a clip 54 is shown having a hinged head 56, along with a body 58 having teeth 60. The hinged head 56 folds down upon insertion, and can be hinged upward to provide a grasping handle for removal of the clip 54. In this manner, the clip 44 is also releaseably engageable with a display mounting surface such as peg board.

In a still further embodiment, a clip 62 includes a head 64 and body 66 comprised of two scissor portions 68. The scissor portions 68 have a central pivot point and retaining grooves 70. After the clip 62 is inserted the head 64 can be toggled to deploy the grooves 70 into or behind the display mounting surface in order to provide for releasable retention. The clip 62 can be removed by toggling the head 64 back into the position where the scissor portions 68 are aligned. In this manner, the clip 64 is also releaseably engageable with a display mounting surface such as peg board.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

Figure 30:
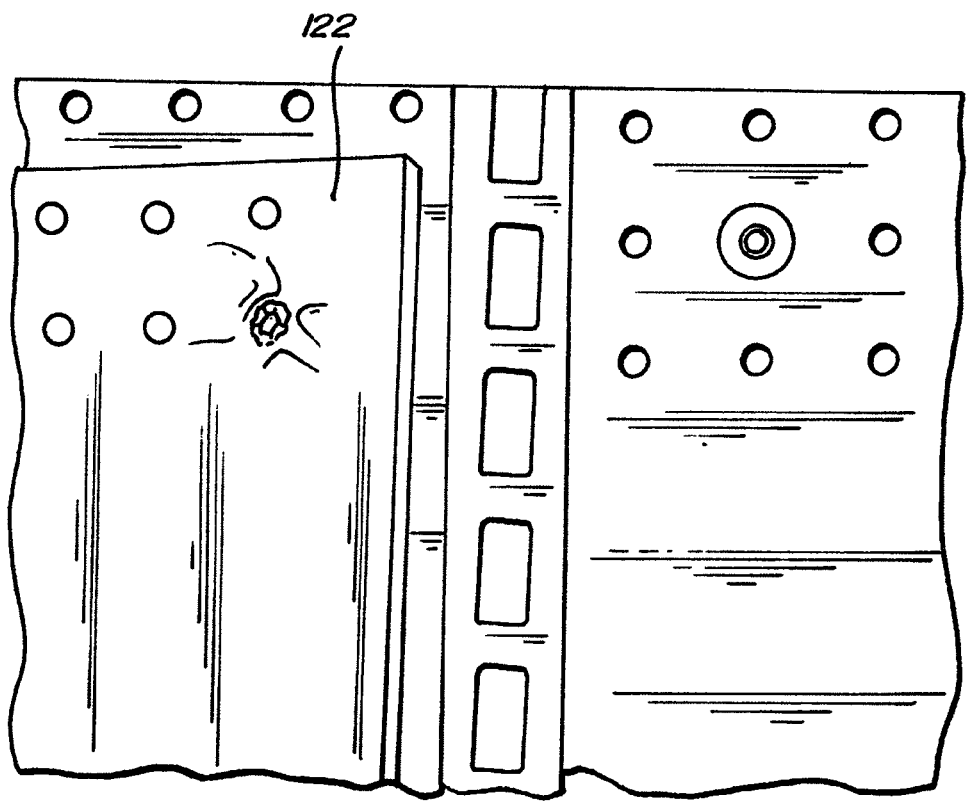
FIG. 30 is a view of a clip of the present invention as applied.

In yet another embodiment of the invention, FIGS. 9-18 show a clip 72 comprised of a head 74, body 76, and threads 78. The head 74 of the clip 72 is raised and tapered to provide a surface that that is easy to grasp in a manner that allows a user to thread the clip 72 by hand into a display backer board, such as peg board. The clip 72 further comprises a notch 78 in the head 74 that is designed to receive and retain a display 122, such as a poster, as shown in FIG. 30. The notch 78 extends around the circumference of the head 74. The display 122 press fits over the head 74 of the clip 72 and then is captured by the notch 78. Using multiple clips 72 at or near the edges of the display 122 secures the display 122. In this manner, the display 122 does not need to have predetermined perforations or hole, but instead the head 74 of the clip to punch through the display 122.

The clip 72 includes threads 80 on the body 74 that allow for threading the clip 72 into a backer board, such as peg board. The threads 80 include enlarged threads 82 on the lower two or three turns of the threads 80. This allows for the clip 72 to more easily initially insert into and grip the holes of a backer board. Generally, when an item such as clip 72 is applied, it must first be inserted by hand and then re-gripped to screw the clip 72 into place. The enlarged threads 82 allow the clip 72 to more easily stay in place as it is re-gripped without making it more difficult to thread the clip 72 into the backer board.

A still further embodiment of the invention is shown in FIGS. 19-23, which shows a clip 84 comprised of a head 86, body 88, and threads 92. The clip 84 includes a notch 90 on the lower portion of the head 86 designed to receive and retain a display 122, such as a poster. The notch 90 is cam shaped and as such is comprised of a partial cut-out on one side of the head 86 of the clip 84. The display 122 press fits over the head 86 of the clip 84 and this is captured by the notch 92. Using multiple clips 84 at or near the edges of the display 122 secures the display 122.

The clip 84 also comprises threads 92 including enlarged threads 94 on the lower two or three turns of the threads 92. This allows for the clip 84 to more easily initially insert into and grip the holes of a backer board as described herein-above.

The clip 84 also includes a hex head 96. The hex head 96 is designed to receive the open end of a hex driver (not shown) and greatly aids in inserting the clip 84 into backer board. While hand threading of clips is contemplated, and entirely appropriate with for example clip 72, if a large number of clips need to be secured clip 84 provides the ability to use a driver which can provide even greater efficiency.

FIGS. 24-28 show a tool 98 that can also be used with the clip 84. In this case, a tool 98 having a head 100, a body 102, and a hex channel 104 designed to engage the hex head 96 of the clip 84 is provided. The head 100 of the tool 98 is shaped and sized to allow for the tool 98 to be used by hand, or the head 100 includes its own hex shaped end 106 to also be used with a hex driver. The extra size of the tool 98, and in particular the extended head 100, may make is easier to apply a hex driver to the tool 100 instead of applying the hex driver directly to the clip 84.

Figure 29:
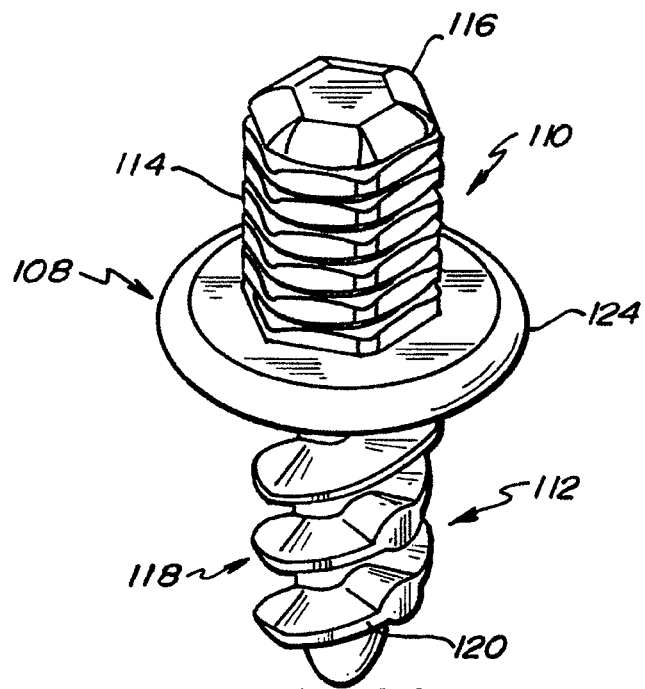
FIG. 29 is a perspective view of a clip of the present invention.

In yet a still further embodiment, as shown in FIG. 29, a clip 108 is shown. The clip 108 includes a head 110, and a body 112. The body 112 includes lower threads 116 substantially the same as the threads of clips 72, 84, wherein the lower threads 116 includes enlarged threads 120 for ease of insertion.

The clip 108 also includes upper threads 114. The upper threads 114 allow for attaching one or more different types of accessory items to the clip 108, such as a hook to provide for securing hanging display items or any other similar variation. In this embodiment, the clip 108 can be used with a wide variety of items that all can then be secured to, and used with a backer board display.

The clip 108 also includes a hex head 116 on the end of the head 110, which functions in the same manner described herein-above with relation to clip 84. The clip 108 would first be inserted into the backer board by means of the lower threads 118, with or without the aid of a hex driver or tool 98. Then, the accessory can be threaded on to the upper threads 114 in a conventional manner.

The clip 108 further includes a notch 124 in the head 110 that is designed to receive and retain a display 122, such as a poster, as shown in FIG. 30. The notch 78 extends around the circumference of the head 74 in the manner described herein-above.

Figure 31:
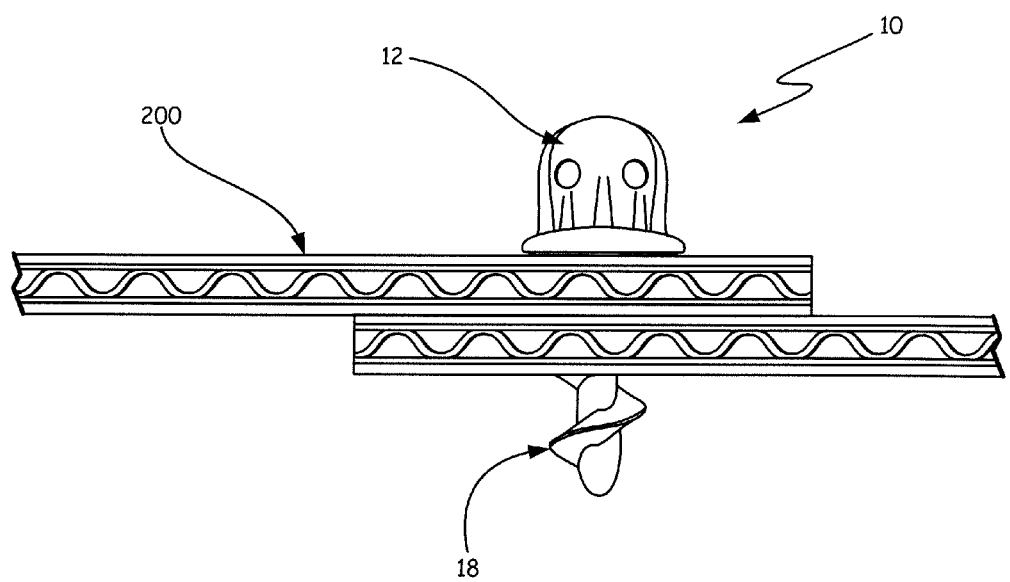
FIG. 31 is a side perspective view of a clip of the present invention together with a display assembly.

FIG. 31 shows an alternative embodiment of the present invention. In this embodiment the clip 10, which includes a head 12 having a thumbscrew protrusion 14, and a body 16 with spaced apart threads 18, is used to create an assembly 200. The assembly, in one embodiment, comprises two sections of cardboard which can be used to create a display or constructed sign. The thread 18 is large enough and strong enough to tightly secure the assembly, and the point of the clip 10 is sharp enough to piece easily pierce the outer layer of the assembly 200.

The clip 10 has the advantage of securing the assembly 200 from one side and does not require affixing anything on the other side of the assembly. Thus, one person can construct the assembly 200 even in the case of large multiple piece complex assemblies 200.

FIGS. 32a-d show yet another embodiment of the present invention, also adapted for use in constructing assemblies 200. FIG. 32a shows clip 10, generally similar to those described herein above, except that it includes a hex head 202 which is provide for the use of a hex wrench or tool to drive the clip 10 in place. A busing 204 is also provided. As shown in FIG. 32b, the clip 10 threads into the bushing 204. The bushing 204 is embedded into the assembly 200 from either side. The bushing 204 provides a more secure fit between the members of the assembly 200.

FIG. 32c shows an alternative bushing 204. The bushing 204 includes a collar 206 into which the clip 10 threads and/or is inserted. The bushing 204 includes opposing flanges 208 and cleats 210. The oval shape of the busing along with the flanges 208 and cleats 210 anchor the bushing 204 in the assembly 200 to prevent the bushing 204 from moving. As shown in FIG. 32d, the collar 206, flanges, and cleats 208 penetrate the surface of the assembly becoming embedded therein which prevents movement of the bushing 204 and further creates a strong connection between components of the assembly 200 upon insertion to the clip 10 into the bushing 204.

Figure 33:
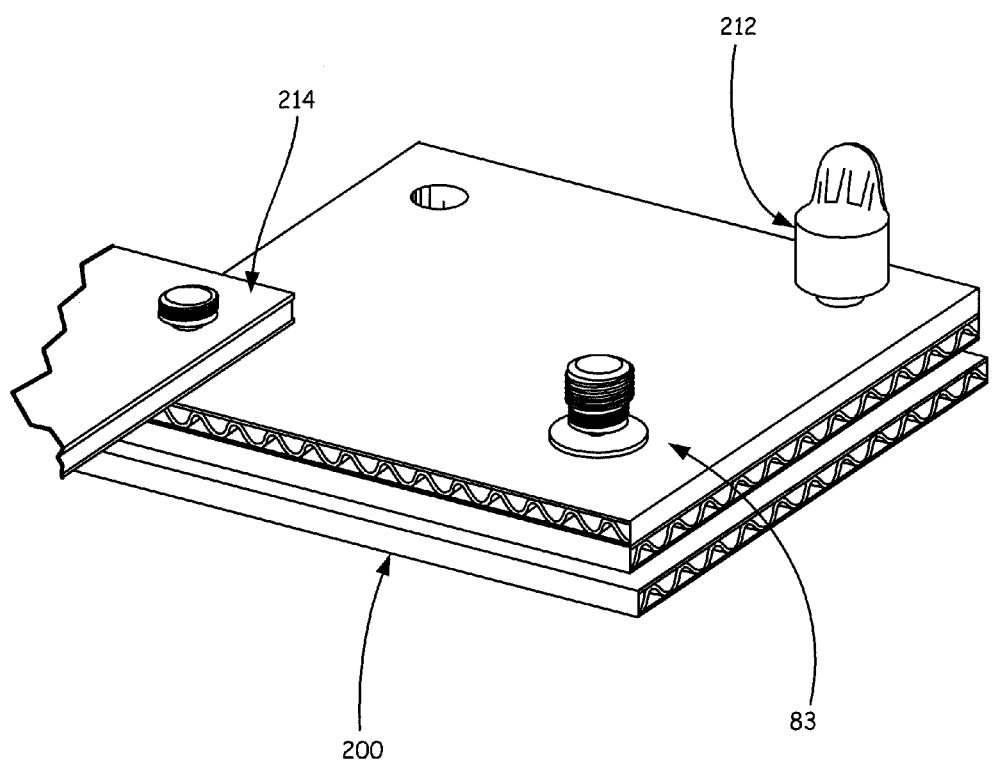
FIG. 33 shows a clip applied to a portion of an assembly as a tool for driving the clip.

FIG. 33 shows a still further embodiment of the present invention. In this embodiment a clip 83, which is identical to the clip shown in FIGS. 21-23 except that it includes threads upper 114 as shown in FIG. 29. The clip 83 is used to create assemblies 200 as shown, and a tool 212 is provided to drive the clip 83 through the members of the assembly 200. The tool 212 has internal threads that match the upper threads 114. The tool 212 can be left on or removed after driving the clip 83. Left in place the tool 212 has the advantage of further securing items between the tool 212 and the clip 83.

Figure 34:
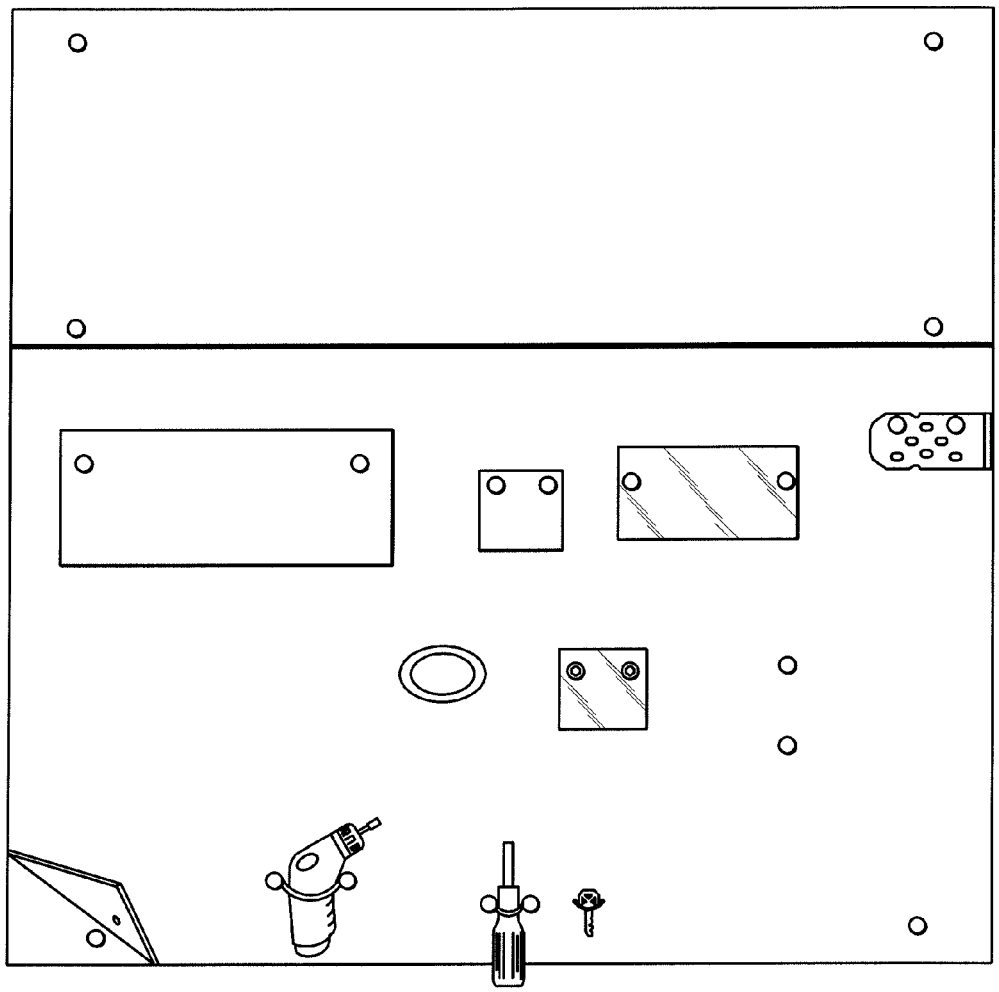
FIG. 34 shows the clip and tool applied.

The clip 83 includes the notch 90 on the lower portion of the head 86 designed to receive and retain a component 214, such as a display item, like a poster, bracket, tools, further assembly members, and the like. FIG. 34 shows the clip 83 in various configurations. The clip 83 allows for the easy use and removal of backer paper, as well as overlaying various posters, attachments and the like, which can be removed easily or new material can be placed on top of existing material. The present invention also has the advantage of not being limited to use with peg board, but can be used with any surface that is reasonably capable of perforation or penetration.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A fastener clip, said clip comprising:
   a hex head adapted for receipt of a hex wrench to drive said clip into place;
   a body connected to said head;
   a retainer notch in said head to engage materials; and
   an oval shaped bushing that engages said material and said clip.

2. The clip of claim 1 wherein said bushing further comprises a collar.

3. The clip of claim 2 wherein said bushing further comprises cleats.

4. A fastener clip, said clip comprising:
   a threaded head comprising a slotted cam;
   a body connected to said head; and
   a retainer notch in said head to engage materials.

5. The fastener of claim 4 wherein a display item is placed over said head and at least partially retained by said slotted cam.

* * * * *